Jan. 4, 1944.   J. T. SMITH   2,338,362
MEANS FOR MAINTAINING OVER-RUN IN ICE CREAM AND LIKE PRODUCTS
Filed May 31, 1940
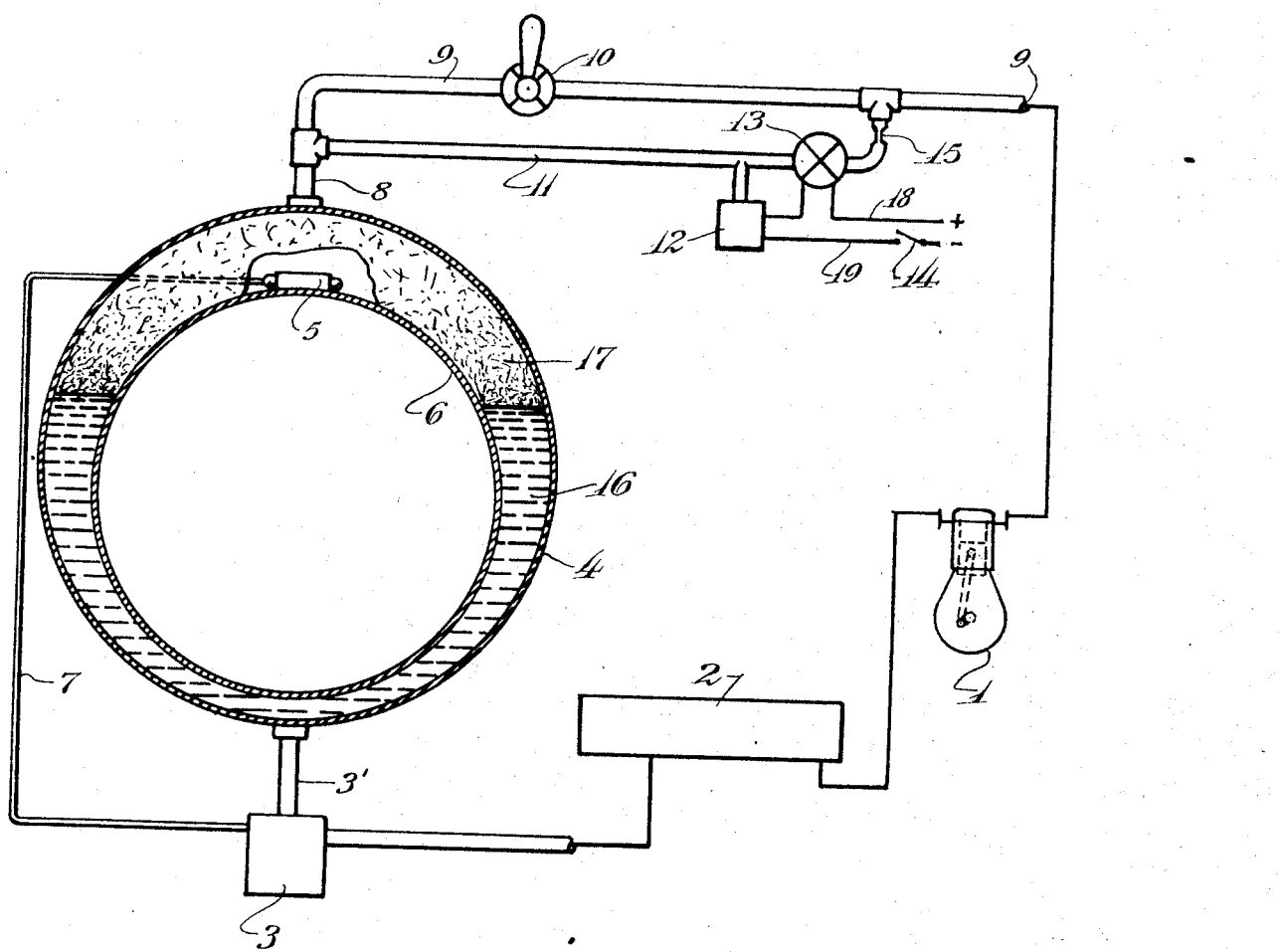
Inventors:
James T. Smith
Alexander L. Reiter
By, Carl S. Lloyd
Attorney Patented Jan. 4, 1944

2,338,362

UNITED STATES PATENT OFFICE 2,338,362

MEANS FOR MAINTAINING OVERRUN IN ICE CREAM AND LIKE PRODUCTS

James T. Smith and Alexander L. Reiter, Chicago, Ill., assignors to Mills Novelty Company, Chicago, Ill., a corporation of Illinois Application May 31, 1940, Serial No. 338,200

6 Claims. (Cl. 62—114)

This invention relates to the production of ice-cream in batch ice-cream freezers, and more particularly to a method and means for maintaining the desired over-run of the ice-cream or other frozen product after it has once been obtained.

Over-run may be defined as the percentage of air whipped into the mix and is determined in old-style freezers by the time of whipping after the cream is frozen down to about 25 degrees. In some of the more modern freezers the volume of air is measured and the over-run can be accurately determined. Over-run also varies with the composition of the mix and the construction of the whipper mechanism. Whipping may be accomplished with or without further refrigeration. When the proper over-run has been reached, further whipping is discontinued and the ice-cream may be placed in hardening chambers and the temperature greatly reduced without changing the percentage of over-run; then later the ice-cream may be brought to a very much higher temperature, so as to be palatable, this also without affecting the percentage of over-run if the cream is not warmed to a higher temperature than about 25 degrees. However, instead of removing the ice-cream and placing it in hardening chambers after the desired percentage of over-run is obtained, it may be, and in modern practice often is, left in the freezer for a considerable time before being drawn off into packages or served directly from the freezer. This presents a difficult problem of maintaining the desired percentage of over-run, and it is with this problem that the present invention is concerned.

Various methods of maintenance have been attempted involving for the most part the reduction in speed of agitation of the mix at the time the desired percentage of over-run is reached. These methods have not proved to be very effective from the standpoint of accuracy and uniformity, and the primary object of the present invention is to provide a superior method in which the control of the over-run is accomplished by a different principle, namely, by controlling the temperature of the refrigerant.

Another object of the invention is to provide an improved thermostatic control of the operation of the expansion valve by which the liquid refrigerant is admitted to the chamber surrounding the cylinder or barrel in which the freezer mix is contained.

Other objects and advantages will become apparent from the following description and the accompanying drawing of a preferred embodiment of the invention.

For purposes of illustration we have shown in the drawing a single figure, comprising a schematic diagram showing a freezer and a refrigeration circuit in which the features of the invention are embodied.

In said drawing a combined compressor and condenser is indicated by the reference numeral 1. This unit condenses and pumps the refrigerant vapor into a receiver tank 2 at high pressure and temperature. The refrigerant flows from said receiver tank 2 into a liquid chamber between an outer barrel 4 and an inner barrel 6 through a thermostatic expansion valve 3 and a pipe 3', as demanded for purposes of freezing the mix which is contained in the barrel 6, in which there is located a whipper mechanism (not shown) of usual construction. The expansion valve 3 is controlled by means of a thermal fluid contained in a bulb 5 and capillary tubing 7, the bulb 5, in accordance with our invention, being located adjacent the barrel 6. In the embodiment shown said bulb is clamped to the top of said barrel 6 and the temperature in the bulb is accordingly governed by the combined effect of the temperature of said barrel and the temperature of the refrigerant in the chamber between this barrel and the barrel 4. Accordingly the opening and closing of the expansion valve 3 is controlled by this mean temperature so that exactly the right amount of refrigeration is obtained to efficiently freeze the contents of the barrel 6 at the desired rate.

The pressure and temperature of the liquid refrigerant are decreased upon passing through the expansion valve 3, the liquid, indicated by the reference numeral 16, rising to an appropriate level in the expansion chamber and being vaporized through absorption of heat from the ice-cream mix through the barrel 6 in the well known manner, the vapor in the upper part of the chamber being indicated by the numeral 17.

Said vapor during normal freezing passes from the chamber through suction lines 8 and 9 and a valve 10, the latter, as shown, being located in the line 9 and being illustrated, for the sake of simplicity, as a hand-operated valve. This valve during the normal freezing period remains open and is closed when the desired consistency of the ice-cream is obtained. It will be understood that the refrigerant vapor passes through said suction lines 8 and 9 back to the compressor-condenser unit 1, whereupon the cycle of operations is repeated.

After the freezing has been completed and the desired degree of over-run has been reached, both the temperature of the ice-cream and the over-run are maintained, in accordance with our invention, by means of intermittent refrigeration. This is accomplished automatically by means which will now be described.

A conduit 11 connects the conduits 8 and 9 in such a manner as to by-pass the valve 10 which is closed after completion of the normal freezing, and said by-pass conduit is communicably connected with a pressure controlled regulating switch 12, which, in turn, is electrically connected to a solenoid valve 13 in said conduit 11. The switch 12 is in a circuit comprising positive and negative lines 18 and 19, respectively, the solenoid of the valve 13 being also included in said circuit. A toggle switch 14 is provided in the circuit and it will be understood that when the apparatus is set for automatic operation said switch, as well as the valve 10, will be closed.

Since pressure and temperature are directly related, a rise in temperature in the freezer barrel to a predetermined point will cause a corresponding increase in pressure in the expansion chamber which will be communicated through the conduit 11 to the pressure-controlled switch 12, causing the latter to close and thereupon complete the circuit 18, 19 to energize the solenoid of the valve 13 and open said valve. This will open communication through the suction lines 8, 11 and 9 to the condenser-compressor unit 1, whereupon refrigeration will begin and continue until the temperature in the freezer barrel and the pressure in the expansion chamber and the conduits 8 and 11 have decreased to a predetermined point, whereupon the pressure regulated valve 12 will automatically open, allowing the solenoid valve 13 to close, thereby again stopping the refrigeration until the temperature and pressure increase to the upper point of the pressure differential, at which time the switch 12 will again close and cause a repetition of the cycle of operation. It will be understood that the pressure differential may be adjusted to maintain the desired conditions of temperature and over-run by suitable selection and adjustment of the pressure-controlled switch 12, both this unit and the solenoid valve 13 being of known construction so that their characteristics and operation will be well understood by those familiar with the art without detailed illustration.

A constriction or blind 15 is provided in the conduit 11 between the valve 13 and the point of connection of said conduit with the conduit 9, the function of this constriction being to restrict the rate of flow of the vapor back to the compressor, thus preventing excessive short cycling.

The foregoing detailed description has been given for clearness of illustration only, and no unnecessary limitations should be understood therefrom, but the appended claims should be construed as broadly as permissible in view of the prior art.

We claim:

1. In a freezer system, the combination of an ice-cream freezer having a freezer barrel and a refrigerant chamber surrounding the same, means whereby the contents of the freezer barrel may be frozen by action of a refrigerant circulated in the system and cyclically passing through said chamber in contact with said barrel, said means including a thermostatic expansion valve for controlling the flow of refrigerant to said chamber, and means comprising a thermostatic bulb located in contact with the freezer barrel within said chamber, tubing connecting the same with said expansion valve and a thermal fluid within said bulb and tubing for controlling the operation of said valve.

2. In a freezer system, the combination of an ice-cream freezer having a freezer barrel and a refrigerant chamber surrounding the same, means whereby the contents of the freezer barrel may be frozen by action of a refrigerant circulated in the system and cyclically passing through said chamber in contact with said barrel, said means including a thermostatic expansion valve for controlling the flow of refrigerant to said chamber, and means directly responsive to the temperature of said freezer barrel for controlling the operation of said valve, said last mentioned means comprising a thermostatic bulb subject to such temperature, and tubing connecting said bulb with said expansion valve, said bulb and tubing containing a thermal fluid whereby operation of the valve may be effected by temperature changes in the bulb.

3. A refrigeration system comprising a compressor, a condenser, a liquid receiver, a refrigerant expansion chamber wherein liquid refrigerant may be vaporized to cause refrigeration, a suction line between said chamber and the compressor, a refrigeration control valve in said suction line, a by-pass line extending between sections of said suction line on opposite sides of said valve, and a pressure-operated valve in said by-pass line controlled by the pressure in said chamber whereby, with said control valve in closed position, said suction line may be opened to cause operation of the refrigeration system when said pressure rises to a given maximum and closed to stop such operation when said pressure falls to a given minimum.

4. A refrigeration system comprising a compressor, a condenser, a liquid receiver, a refrigerant expansion chamber wherein liquid refrigerant may be vaporized to cause refrigeration, a suction line between said chamber and the compressor, a refrigeration control valve in said suction line, a by-pass line extending between sections of said suction line on opposite sides of said valve, a pressure-operated valve in said by-pass line controlled by the pressure in said chamber whereby, with said control valve in closed position, said suction line may be opened to cause operation of the refrigeration system when said pressure rises to a given maximum and closed to stop such operation when said pressure falls to a given minimum, said pressure-controlled valve being electrically operated, and a switch controlled by said pressure for causing operation of said electrically-operated valve.

5. A refrigeration system comprising a compressor, a condenser, a liquid receiver, a freezing chamber for ice-cream or the like, a refrigerant expansion chamber adjacent said freezing chamber wherein liquid refrigerant may be vaporized to cause freezing of the contents of said freezing chamber, a suction line between said expansion chamber and the compressor, a control valve in said suction line, a by-pass line extending between sections of said suction line on opposite sides of said valve, and a pressure-operated valve in said by-pass line controlled by the pressure in said expansion chamber whereby, with said control valve in closed position, said suction line may be opened to cause operation of the refrigeration system when said pressure rises to a given maximum and closed to stop such operation when said pressure falls to a given minimum, thus controlling the operation of the refrigeration system in such manner that the temperature and over-run of the ice cream may be maintained within a desired range of values.

6. A refrigeration system comprising a compressor, a condenser, a liquid receiver, a freezing chamber for ice-cream or the like, a refrigerant chamber wherein liquid refrigerant may be vaporized to cause freezing of the contents of said freezing chamber, a suction line between said expansion chamber and the compressor, a control valve in said suction line, a by-pass line extending between sections of said suction line on opposite sides of said valve, a pressure-operated valve in said by-pass line controlled by the pressure in said expansion chamber whereby, with said control valve in closed position, said suction line may be opened to cause operation of the refrigeration system when said pressure rises to a given maximum and closed to stop such operation when said pressure falls to a given minimum, said pressure-controlled valve being electrically operated, and a switch controlled by said pressure for causing operation of said electrically-operated valve, thus controlling the operation of the refrigeration system in such manner that the temperature and over-run of the ice cream may be maintained within a desired range of values.

JAMES T. SMITH.
ALEXANDER L. REITER.